US011334111B2

(12) United States Patent
Kang et al.

(10) Patent No.: US 11,334,111 B2
(45) Date of Patent: May 17, 2022

(54) DISPLAY DEVICE

(71) Applicant: LG ELECTRONICS INC., Seoul (KR)

(72) Inventors: Seunggyu Kang, Seoul (KR); Hyuncheol Cho, Seoul (KR); Woohyuk Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/964,173

(22) PCT Filed: May 3, 2019

(86) PCT No.: PCT/KR2019/005343
§ 371 (c)(1),
(2) Date: Jul. 22, 2020

(87) PCT Pub. No.: WO2020/091167
PCT Pub. Date: May 7, 2020

(65) Prior Publication Data
US 2021/0034098 A1 Feb. 4, 2021

(30) Foreign Application Priority Data

Nov. 2, 2018 (KR) .................. 10-2018-0133286
Dec. 3, 2018 (KR) .................. 10-2018-0153529

(51) Int. Cl.
G06F 1/16 (2006.01)
F16M 11/04 (2006.01)

(52) U.S. Cl.
CPC ......... G06F 1/1601 (2013.01); F16M 11/046 (2013.01); G06F 1/1632 (2013.01); G06F 2200/1612 (2013.01)

(58) Field of Classification Search
CPC .......... G06F 1/1632; G06F 2200/1612; F16M 11/046
See application file for complete search history.

(56) References Cited

U.S. PATENT DOCUMENTS

D356,555 S * 3/1995 Takemasa .................... D14/126
5,583,744 A * 12/1996 Oguchi ................. G06F 1/1683
361/679.58

(Continued)

FOREIGN PATENT DOCUMENTS

KR      200310875       4/2003
KR     1020070082792    8/2007

(Continued)

OTHER PUBLICATIONS

PCT International Application No. PCT/KR2019/005343, Notification of Transmittal of The International Search Report and the Written Opinion of the International Searching Authority, or Declaration dated Aug. 12, 2019, 11 pages.

Primary Examiner — Adrian S Wilson
(74) Attorney, Agent, or Firm — Lee, Hong, Degerman, Kang & Waimey PC

(57) ABSTRACT

A display device including a display unit, a support mounted on a floor and having a battery mounted therein, a stand extending in a vertical direction from the support, a slide bracket coupled to a rear face of the display unit and slidably coupled to the stand, and a station detachably coupled to the support to charge the battery is able to be used, so that a degree of usability is high.

19 Claims, 17 Drawing Sheets

(56) References Cited

U.S. PATENT DOCUMENTS

| | | | | |
|---|---|---|---|---|
| 5,668,570 | A * | 9/1997 | Ditzik | G06F 1/16 248/923 |
| 5,887,837 | A * | 3/1999 | Johns | G06F 1/1632 248/371 |
| 6,712,321 | B1 * | 3/2004 | Su | F16M 11/105 248/123.11 |
| 7,349,203 | B2 * | 3/2008 | Jobs | F16M 11/14 248/160 |
| 7,611,103 | B2 * | 11/2009 | Ha | F16M 11/30 248/125.2 |
| 8,737,064 | B2 * | 5/2014 | Son | G06F 1/1632 361/679.59 |
| D728,558 | S * | 5/2015 | Lee | D14/336 |
| 9,167,707 | B1 * | 10/2015 | Wang | H05K 5/0204 |
| D817,329 | S * | 5/2018 | Chu | D14/374 |
| 10,704,633 | B2 * | 7/2020 | Xu | F16F 1/10 |
| D923,594 | S * | 6/2021 | Kang | D14/126 |
| 2006/0250767 | A1 * | 11/2006 | Brophy | G06F 1/1632 361/679.45 |
| 2007/0102600 | A1 * | 5/2007 | Ishizaki | F16M 11/105 248/176.3 |
| 2007/0205340 | A1 * | 9/2007 | Jung | F16M 11/105 248/125.9 |
| 2008/0237411 | A1 * | 10/2008 | Kim | F16M 11/046 248/122.1 |
| 2008/0288701 | A1 * | 11/2008 | Ward | H01R 35/02 710/303 |

FOREIGN PATENT DOCUMENTS

| | | | | |
|---|---|---|---|---|
| KR | 1020080090254 | | 10/2008 | |
| KR | 101399209 | | 6/2014 | |
| KR | 1020150138716 | | 12/2015 | |
| WO | WO-2013056025 A1 * | 4/2013 | | G06F 1/1607 |

\* cited by examiner

[FIG. 1]
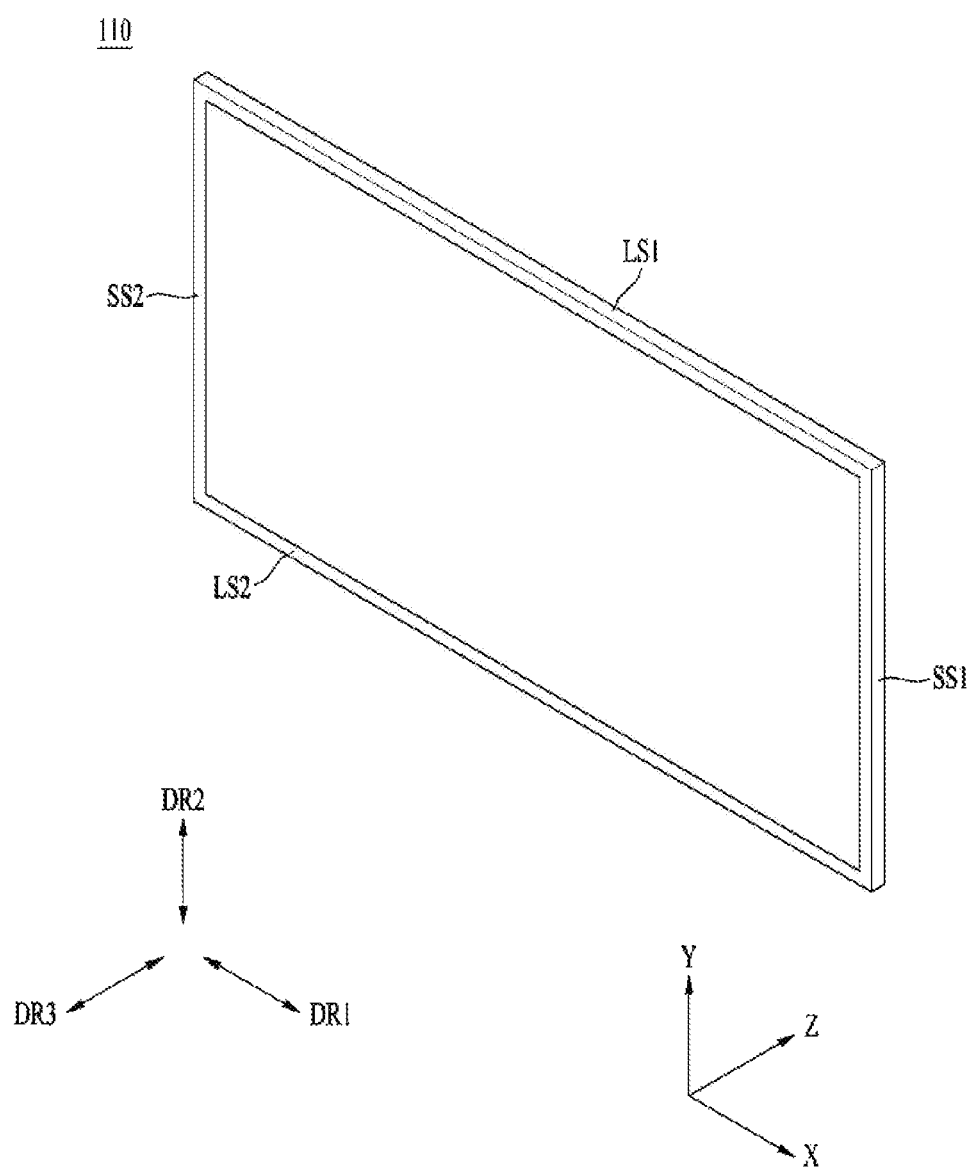

[FIG. 2]
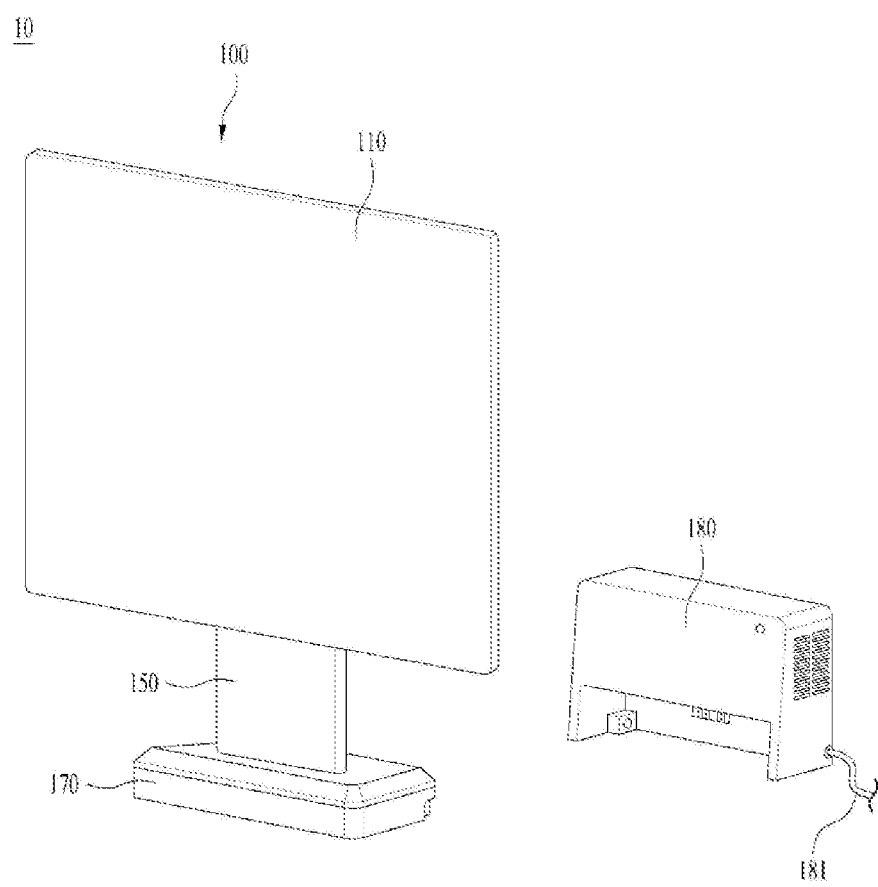

[FIG. 3]
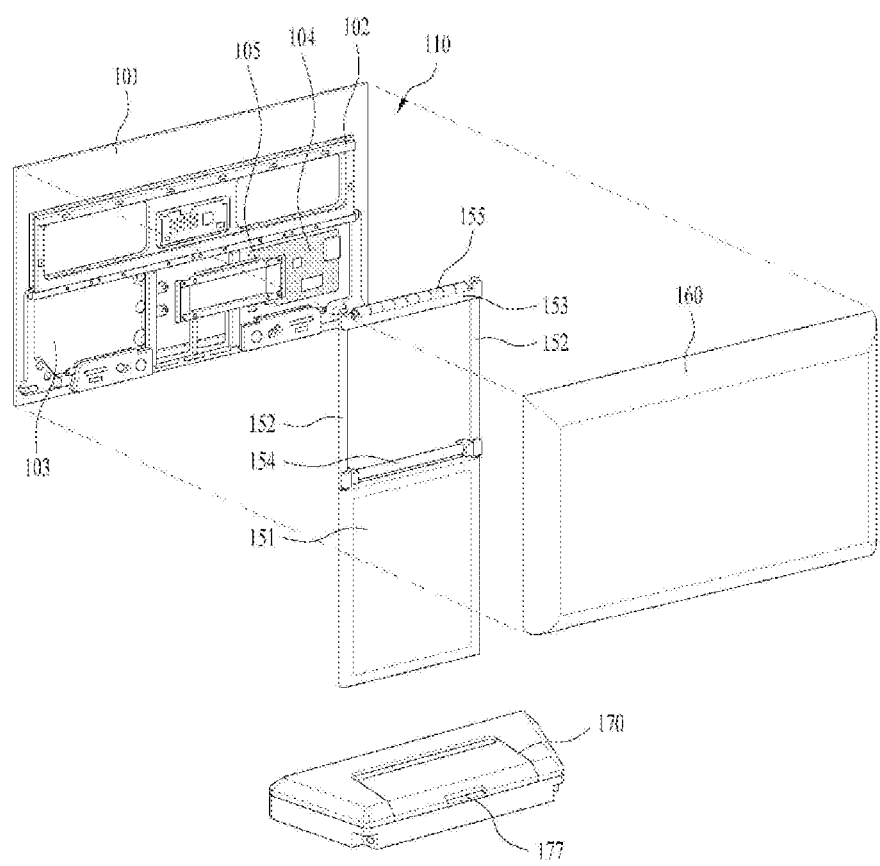

【FIG. 4】
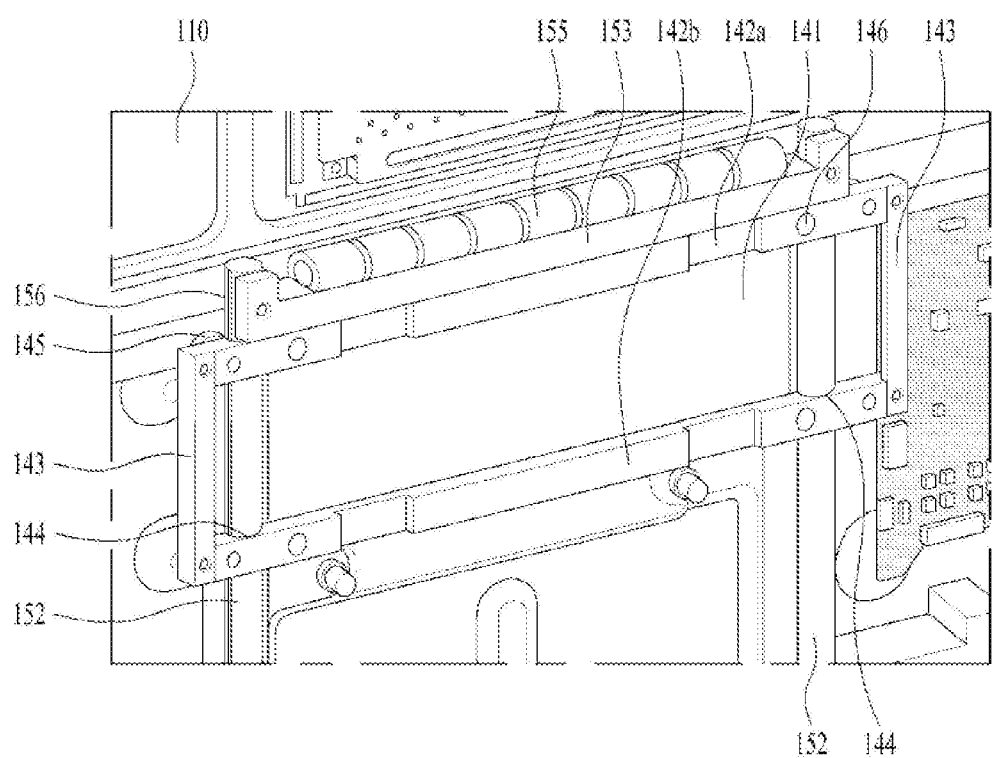

[FIG. 5]
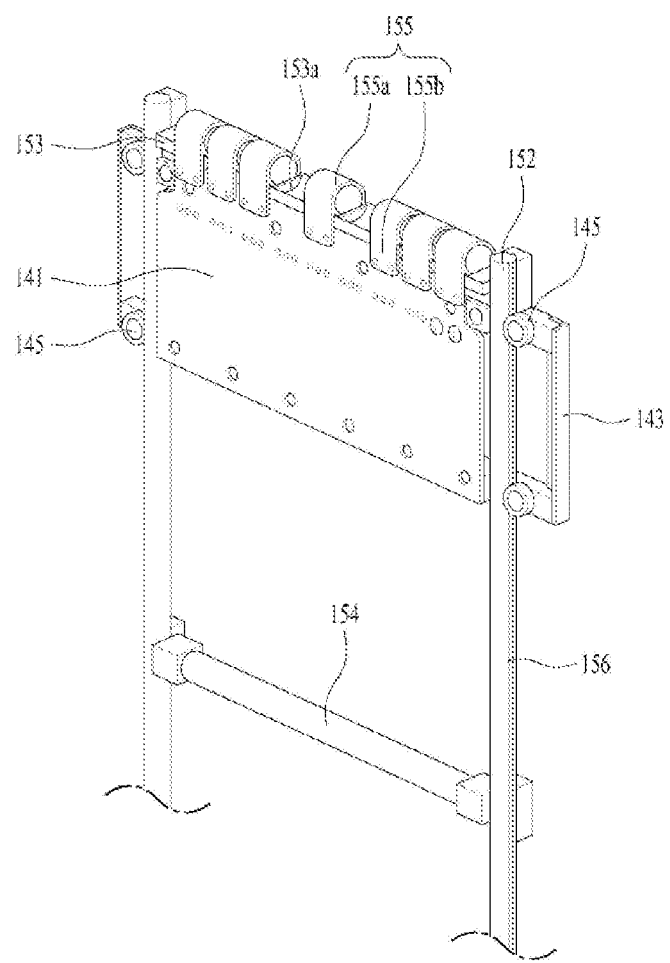

[FIG. 6]
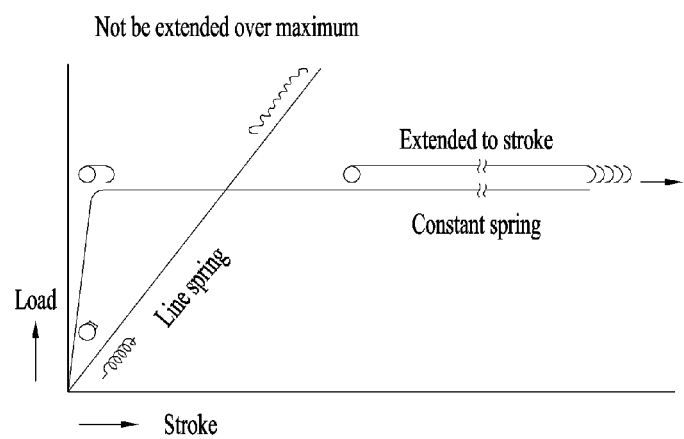
(a)
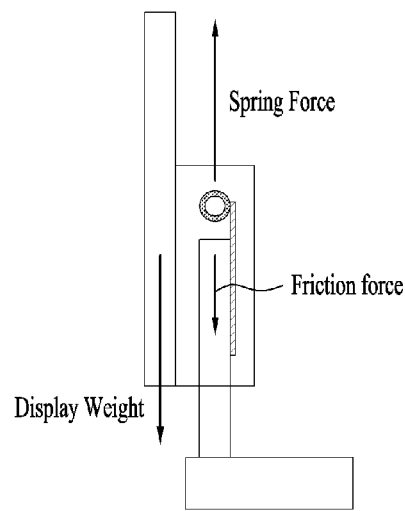
(b)

[FIG. 7]
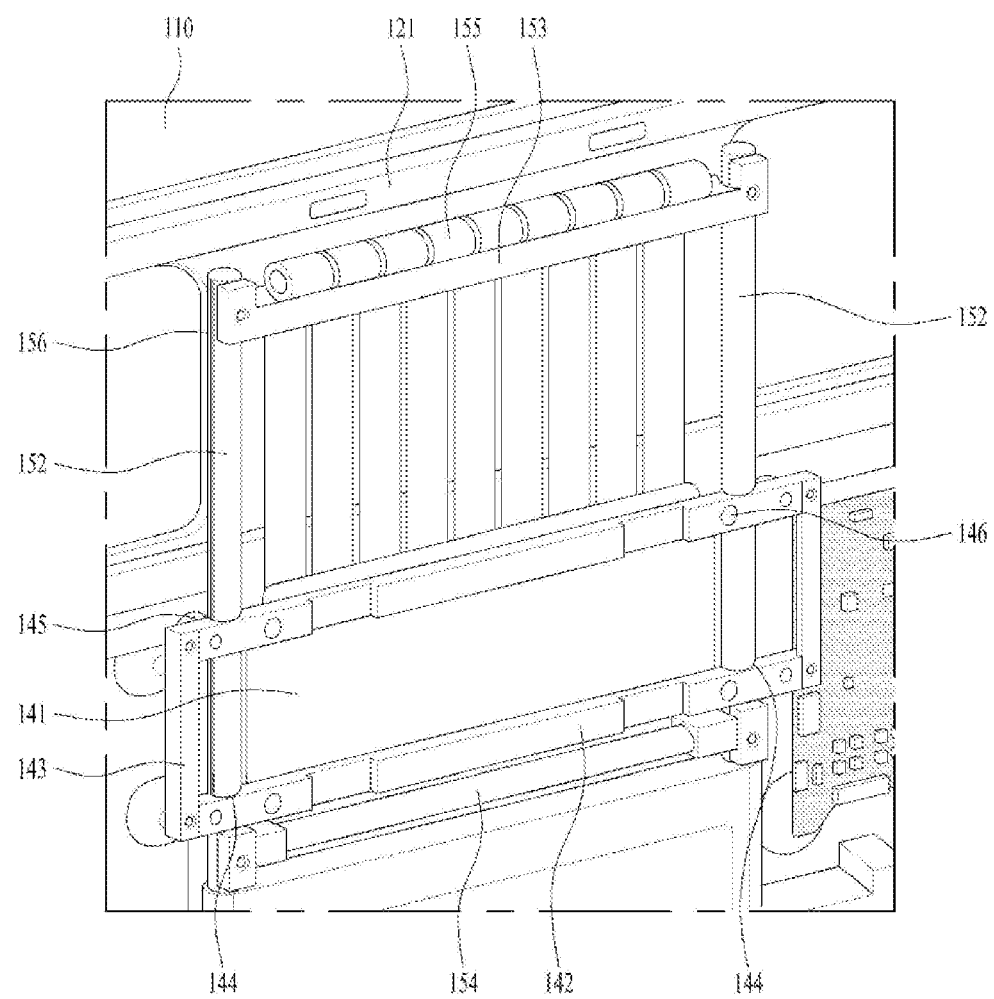

【FIG. 8】
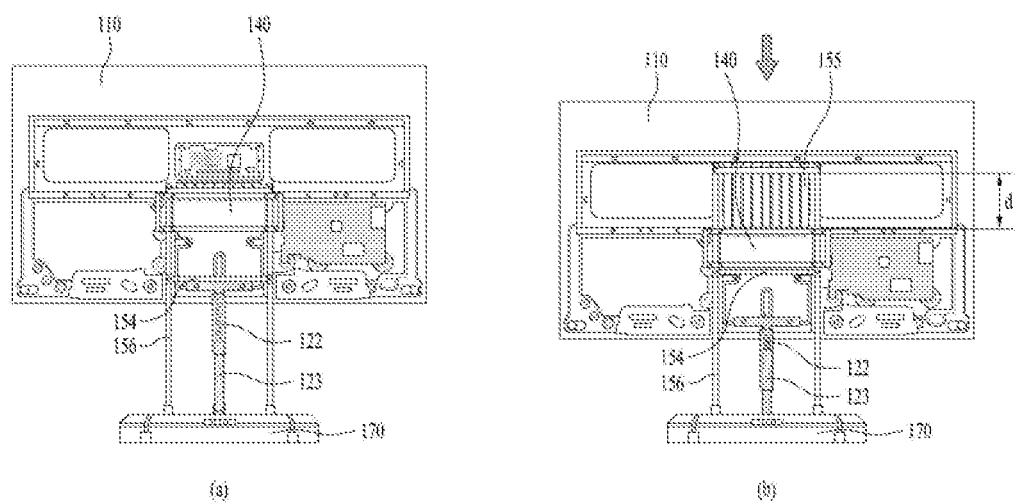

【FIG. 9】
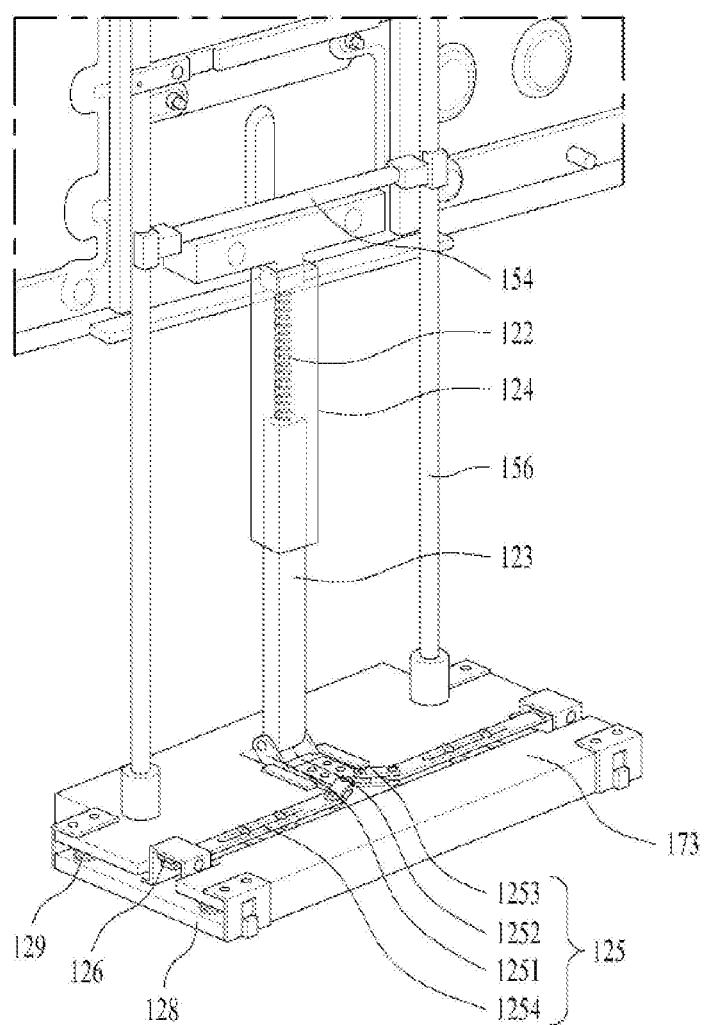

[FIG. 10]
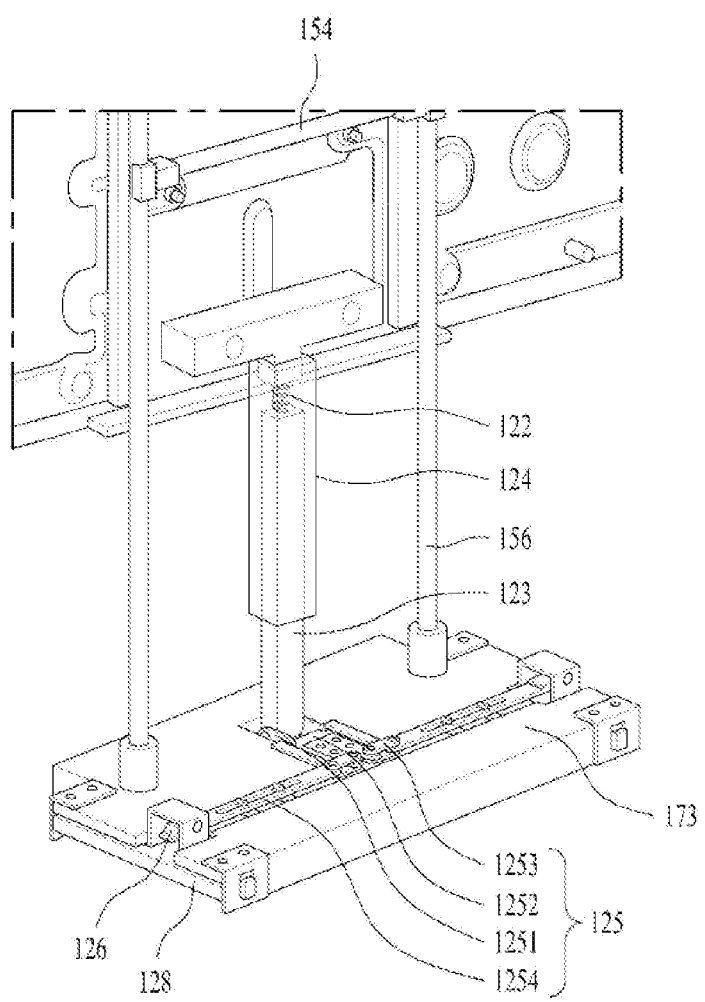

[FIG. 11]
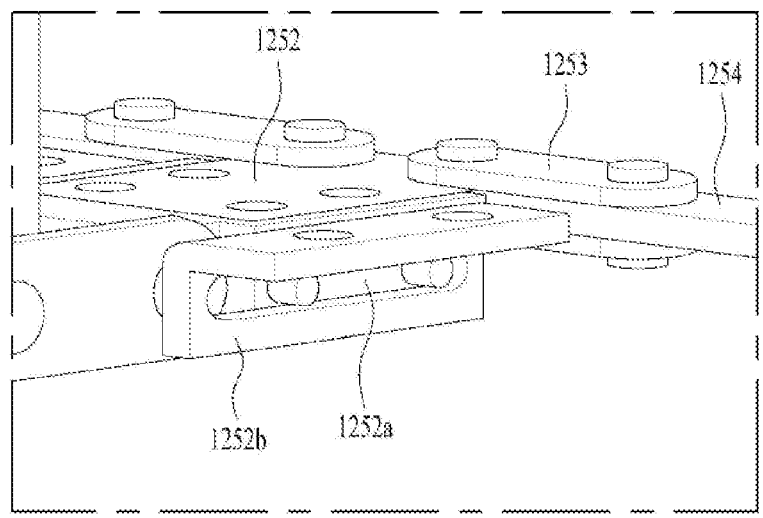
(a)
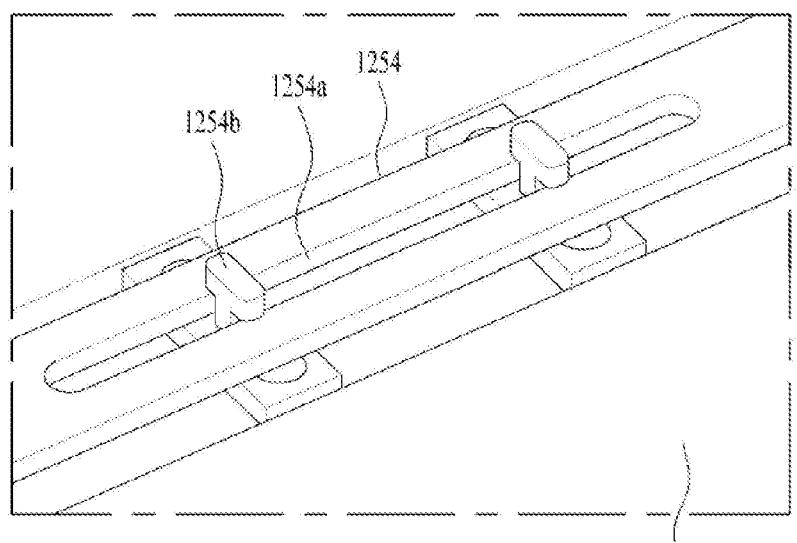
(b)

[FIG. 12]
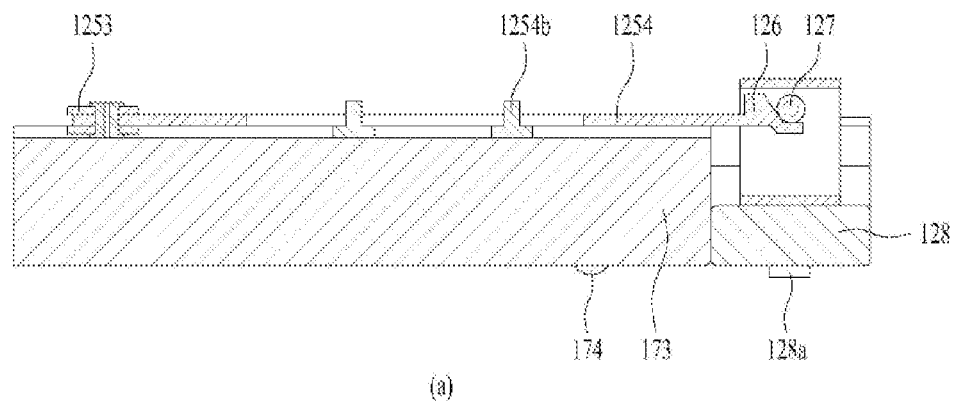
(a)
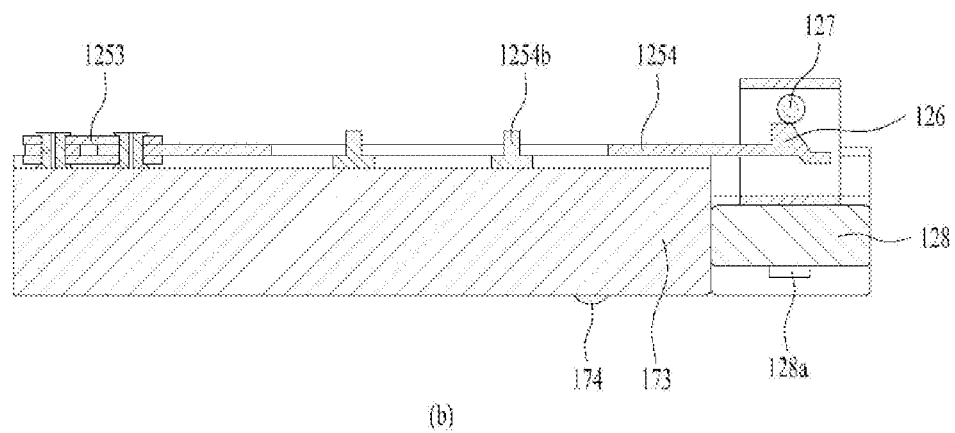
(b)

【FIG. 13】
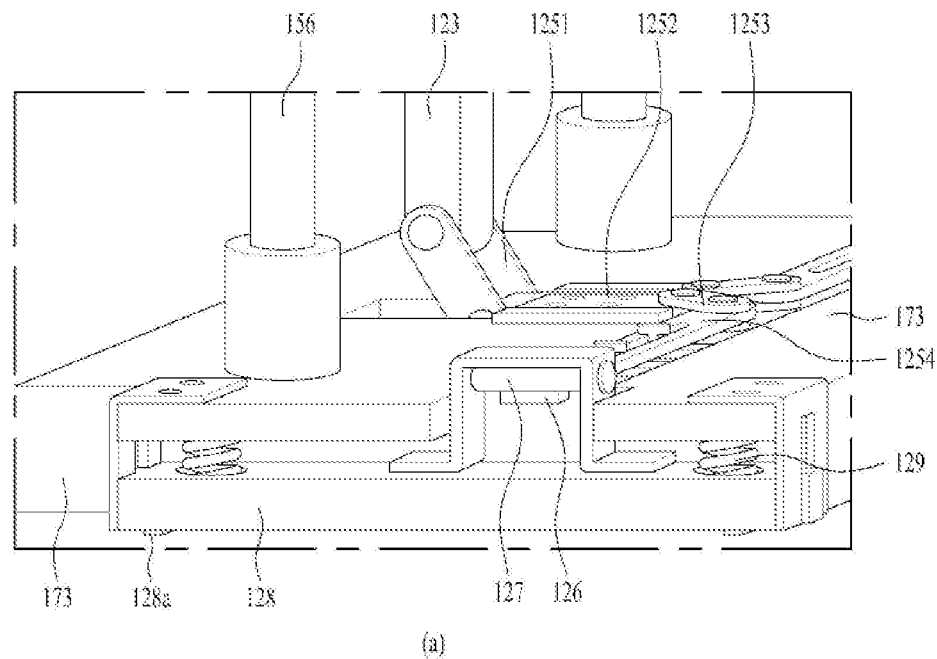
(a)
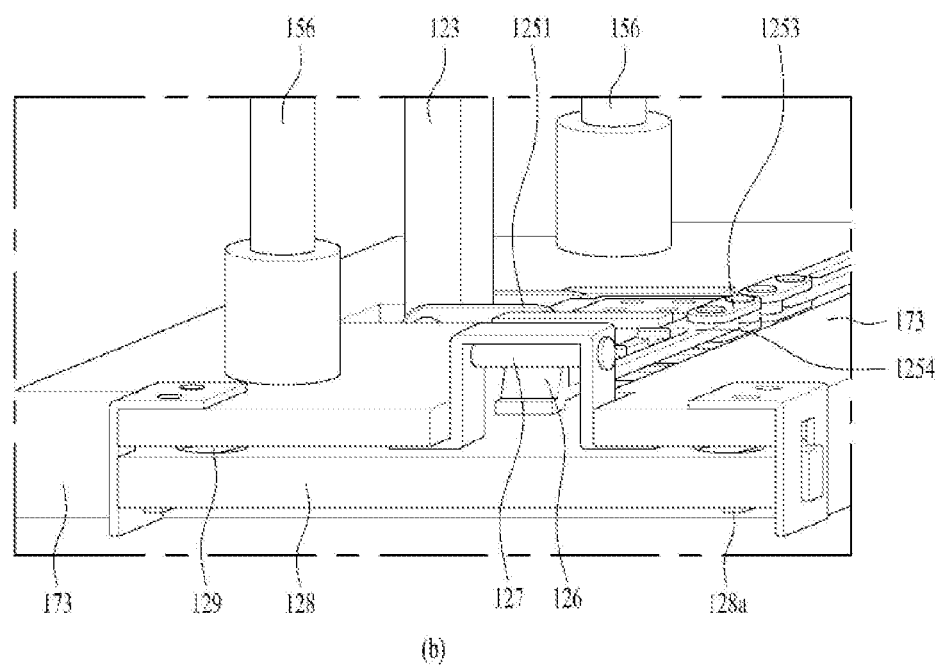
(b)

【FIG. 14】
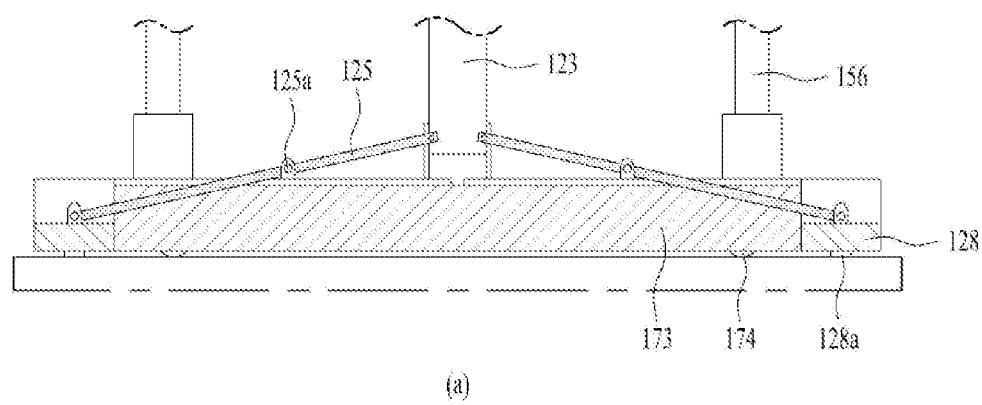
(a)
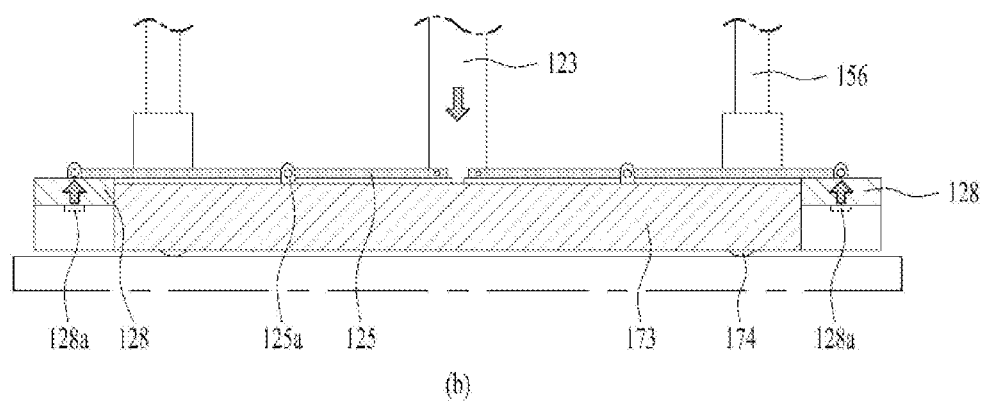
(b)

[FIG. 15]
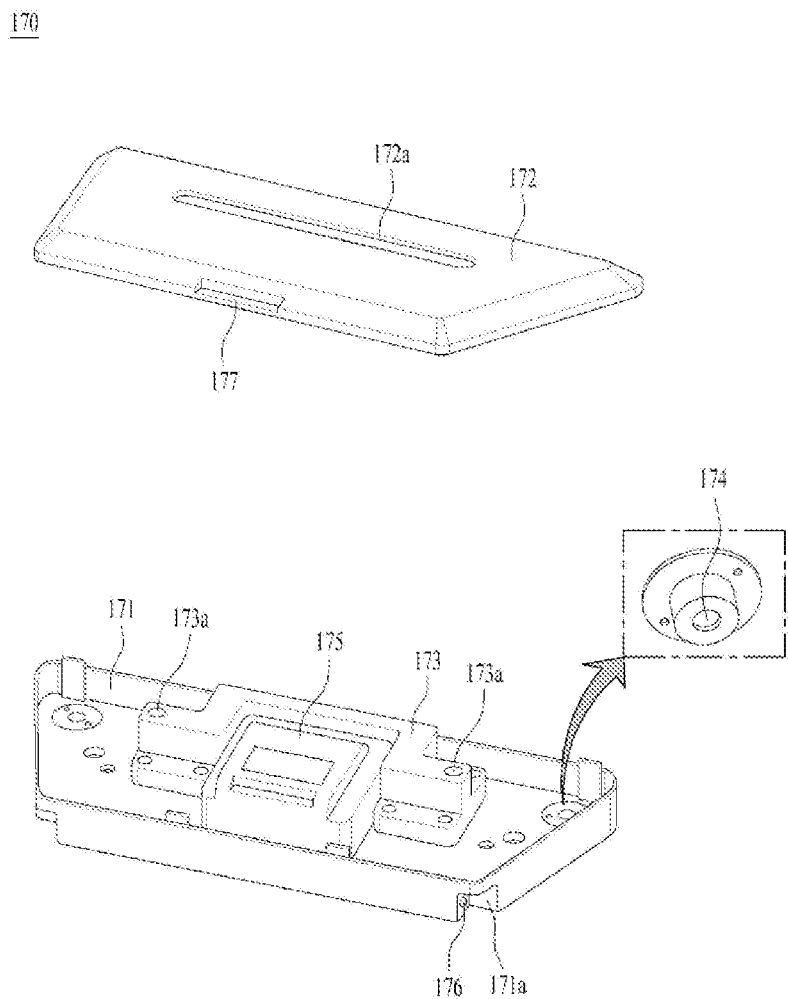

[FIG. 16]
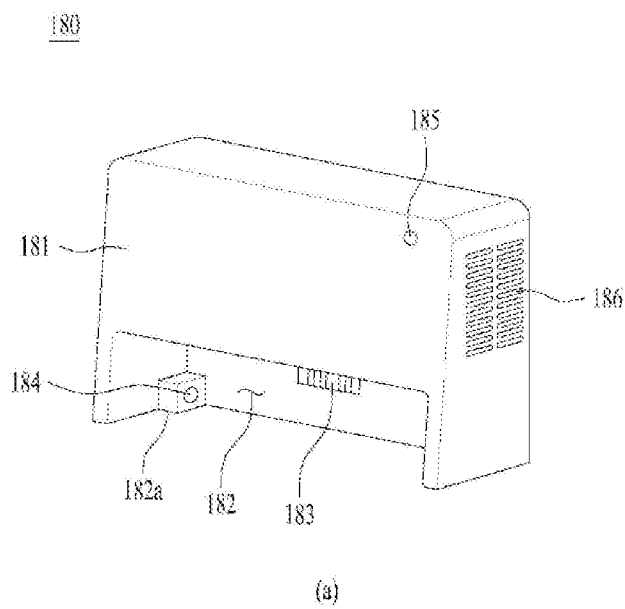
(a)
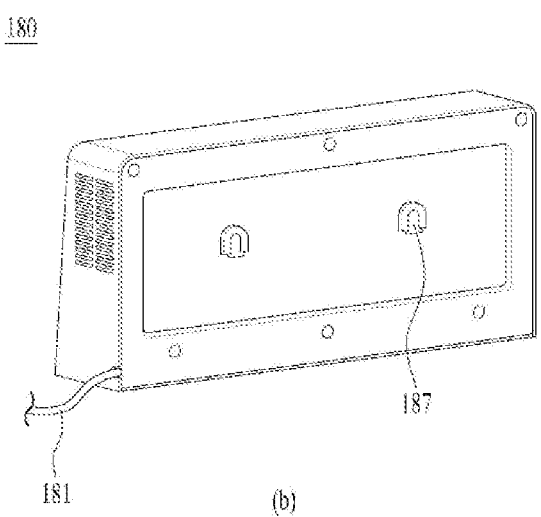
(b)

【FIG. 17】
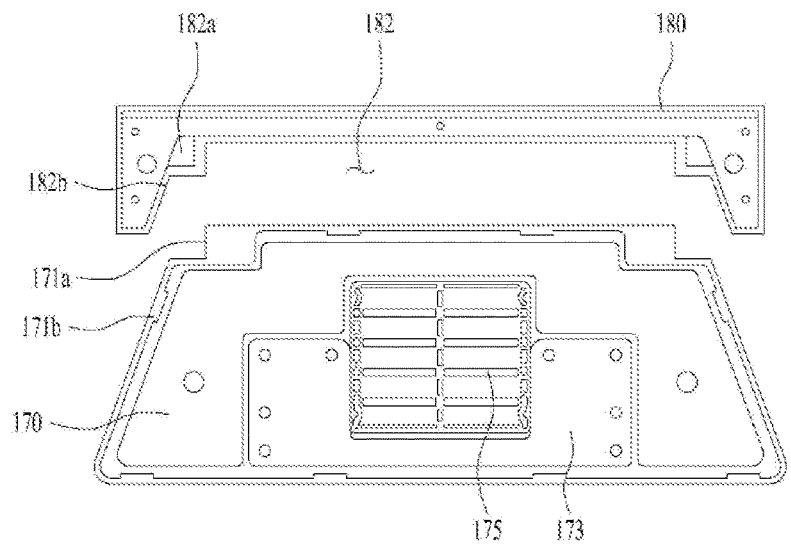
(a)
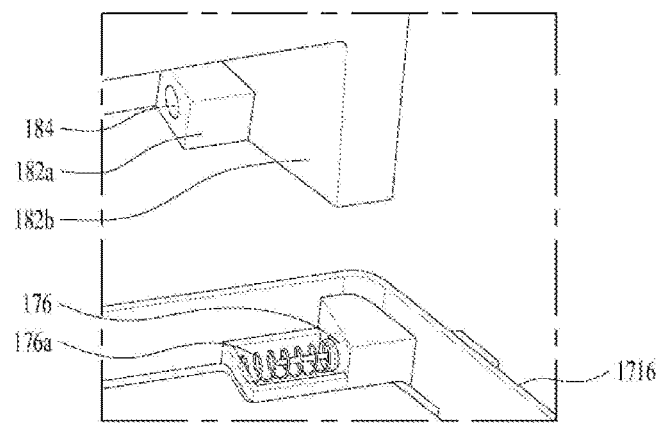
(b)

DISPLAY DEVICE

CROSS-REFERENCE TO RELATED APPLICATIONS

This application is the National Stage filing under 35 U.S.C. 371 of International Application No. PCT/KR2019/005343, filed on May 3, 2019, which claims the benefit of earlier filing date and right of priority to Korean Application Nos. 10-2018-0133286, filed on Nov. 2, 2018, and 10-2018-0153529, filed on Dec. 3, 2018, the contents of which are all hereby incorporated by reference herein in their entireties.

TECHNICAL FIELD

The present disclosure relates to a display device.

BACKGROUND ART

As an information-oriented society develops, a demand for a display device has increased in various forms. Recently, efforts are being made to maximize an output area of a display and simultaneously minimizing a thickness of the display device. Recently, various display devices such as a liquid crystal display device (LCD), a plasma display panel (PDP), an electro luminescent display (ELD), a vacuum fluorescent display (VFD), and the like have been researched and used from a past CRT-type display device.

Among these, a display device using an organic light emitting diode (OLED) has superior luminance characteristics and viewing angle characteristics compared to the liquid crystal display device and does not need a backlight unit, thereby being able to be implemented in a ultra-thin form.

Recently, many studies have been conducted on assembly structures of such display devices. A size of the display device has been varied based on needs of a user, and display device of various forms, such as a curved display device deviating from a conventional flat display device, a wall-mountable display device that is mounted on a wall deviating from a type of a display device placed on a stand, and the like have appeared.

However, because the display device is large, the display device is generally installed as a fixed type, so that there is a problem in that a location where the display device may be viewed is limited.

DISCLOSURE

Technical Problem

One purpose of the present disclosure is to provide a mobile display device that may overcome limitations of a display of a fixed type.

Technical Solutions

A display device including a display unit, a support mounted on a floor and having a battery mounted therein, a stand extending in a vertical direction from the support, a slide bracket coupled to a rear face of the display unit and slidably coupled to the stand, and a station detachably coupled to the support to charge the battery is provided.

The stand may include a roll spring including a metal tape wound in a roll shape, wherein an end of the roll spring is coupled with the slide bracket, and a spring seat located at a top of the stand and mounting the roll spring therein, wherein the display unit may move downward as the roll spring is unwound when a user presses the display unit downward, and wherein the display unit may move upward as the roll spring is wound when the user presses the display unit upward.

The roll spring may be a constant spring having the same elastic force when extended by a length equal to or greater than a predetermined length, and an elastic force of the roll spring may be greater than a sum of weights of the display unit and the slide bracket.

The difference in the sum of the elastic force of the roll spring and the weight of the display unit and the slide bracket may be designed to correspond to the sum of the friction force between the slide bracket and the stand and the friction force between the roll spring and the spring seat.

The stand may further include a guide rail extending in the vertical direction, and the slide bracket may further include a guide roller moving along the guide rail.

The guide rail may include a pair of guide rails spaced apart from each other in a horizontal direction, and a pair of guide rollers may be arranged in the vertical direction on each of the guide rails.

The stand may include each slide bar including each guide rail formed thereon, and the slide bracket may include a slide groove recessed therein to correspond to a shape of the slide bar such that the slide bar is seated in the slide groove.

The roll spring may include a plurality of roll springs arranged in parallel with each other in a horizontal direction, and the spring seat may further include partition walls positioned between the plurality of roll springs.

The display may further include a moving wheel located at a bottom of the support, a moving stopper selectively protruding from the bottom of the support and fixing the support on a floor face, a push bar coupled to a bottom of the display unit and moved in the vertical direction based on a movement of the display unit, and a link structure for accommodating the moving stopper in the support when the push bar is located at a lowermost position and protruding the moving stopper from the support when the push bar moves upward.

The display device may further include a tension spring interposed between the push bar and the display unit, wherein the push bar may be located at a lower side when the display unit is positioned at a lowermost first position, and move upward when the display unit moves upward, and wherein the push bar may not move and the tension spring may be extended when the display unit moves upwardly of a second position.

The display device may further include a pipe-shaped moving rail extending from the bottom of the display unit, wherein a top of the push bar is inserted into a lower portion of the moving rail, wherein the tension spring may be located inside the moving rail and the push bar may move in the vertical direction along the moving rail.

The link structure may be extended toward the moving stopper when the push bar moves downward, wherein the display device may further include a first cam located at an end of the link structure and including an inclined face, and a second cam coupled to the moving stopper and moving along the inclined face of the first cam to move the moving stopper upward or downward.

The link structure may include a first link having one end hinged to the bottom of the push bar, a second link having one end hinged to the other end of the first link, and moving in a first direction, a third link having one end hinged to the other end of the second link, wherein an oriented direction of the third link is changed depending on a position of the push bar, and a fourth link having one end hinged to the third link, extending in a second direction, and having the other end coupled to the first cam.

The display device may further include a first link guide for guiding the second link to move in the first direction, and a second link guide for guiding the fourth link to move in the second direction.

The display device may further include a fastening bracket located inside the support, and a compression spring interposed between a bottom of the fastening bracket and the moving stopper.

The link structure may include one end hinged to a bottom of the push bar, the other end hinged to a top of the moving stopper, and a support point disposed between the one end and the other end of the link structure and fixed to the stand, wherein the one end of the link structure may move downward and the other end of the link structure may move upward to accommodate the moving stopper inside the support when the push bar moves downward, and wherein the one end of the link structure may move upward and the other end of the link structure may move downward and protrude the moving stopper from the bottom of the support to fix the support when the push bar moves upward.

The moving stopper may include a pair of moving stoppers respectively located both left and right sides of the support, and the link structure may include a pair of link structures respectively extended toward the pair of moving stoppers from the push bar.

The stand may include a roll spring including a metal tape wound in a roll shape, wherein an end of the roll spring is coupled with the slide bracket, and a spring seat located at a top of the stand and mounting the roll spring therein, wherein the display unit may move downward as the roll spring is unwound when a user presses the display unit downward, and wherein the display unit may move upward as the roll spring is wound when the user presses the display unit upward.

The support may include a housing having a trapezoidal shape in which a length of a front side corresponding to a front face of the display unit is larger than a length of a rear side corresponding to the rear face of the display unit, and the station may include an accommodating portion recessed in a shape corresponding to the shape of the housing.

The accommodating portion may have an open bottom, an open front face, a blocked top, blocked left and right side faces, and a blocked rear face, wherein the display device may include a first terminal formed in the support, and a second terminal formed on the accommodating portion.

The display device may include a fixing ball having one side exposed outward of the support and the other side connected to an elastic portion inside the support, and a fixing groove defined at a position of the station corresponding to the fixing ball.

Advantageous Effects

The display device according to the present disclosure is equipped with the battery, so that an image may be watched while power is not connected to the display device, and the display device may be used regardless of a location. Therefore, the display device has an advantage of a high degree of usability.

In addition, a height of the display unit may be easily adjusted, so that the display unit may be adjusted to have an appropriate height depending on a situation, such as sitting on a sofa and watching the image, lying on a bed in a bedroom and watching the image, cooking in a kitchen and watching the image, and the like, thereby increasing the degree of usability.

Further, when the display unit is moved upward for the watching of the display device, the moving stopper automatically protrudes to stably fix the display device. Further, when the display device is moved, the display unit is moved downward to lower a center of gravity and the moving stopper is automatically accommodated, so that the display device may be easily moved using the moving wheel.

In addition, the support includes a movement assist wheel, so that the display device may be easily moved.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

DESCRIPTION OF DRAWINGS

FIG. 1 is a view illustrating a display unit of a display device associated with the present disclosure.

FIG. 2 is a view illustrating an embodiment of a display device associated with the present disclosure.

FIG. 3 is an exploded perspective view of a display device associated with the present disclosure.

FIG. 4 is a view of a coupled state of a slide bracket and a height adjusting portion of a display device associated with the present disclosure viewed from one side.

FIG. 5 is a view of a coupling state of a slide bracket of FIG. 4 and a height adjusting portion viewed from the other side.

FIG. 6 is a view for describing a principle of a roll spring of the present disclosure. Further, FIG. 7 is a view illustrating a state in which a roll spring of a display device associated with the present disclosure is stretched.

FIG. 8 is a view for describing a position of a display unit based on a state of a roll spring of a display device associated with the present disclosure.

FIGS. 9 and 10 are views illustrating movements of a push bar and a link structure based on positions of a display unit of a display device associated with the present disclosure.

FIG. 11 is a view illustrating link guides that guide a movement of a link structure of a display device associated with the present disclosure.

FIGS. 12 and 13 are views for describing positions of a moving stopper based on a position of a display unit of a display device associated with the present disclosure.

FIG. 14 is a view illustrating another embodiment of a link structure of a display device associated with the present disclosure.

FIG. 15 is a view illustrating a support of a display device associated with the present disclosure.

FIG. 16 is a view illustrating a station of a display device associated with the present disclosure.

FIG. 17 is a view illustrating coupling of a station and a support of a display device associated with the present disclosure.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Referring to FIG. 1, a display unit 110 may include a first long side LS1, a second long side LS2 opposite the first long side LS1, a first short side SS1 adjacent to the first long side LS1 and the second long side LS2, and a second short side SS2 opposite the first short side SS1.

In this connection, a first short side area SS1 may be referred to as a first side area, a second short side area SS2 may be referred to as a second side area opposite to the first side area, a first long side area LS1 may be referred to as a third side area adjacent to the first side area and the second side area and located between the first side area and the second side area, and a second long side area LS2 may be referred to as a fourth side area adjacent to the first side area and the second side area, located between the first side area and the second side area, and opposite to the third side area.

In addition, although it is illustrated and described that lengths of the first and second long sides LS1 and LS2 are larger than lengths of the first and second short sides SS1 and SS2 for convenience of description, the lengths of the first and second long sides LS1 and LS2 may be approximately equal to the lengths of the first and second short sides SS1 and SS2.

In addition, hereinafter, a first direction DR1 may be a direction parallel to the long sides LS1 and LS2 of the display unit 110, and a second direction DR2 may be a direction parallel to the short sides SS1 and SS2 of the display unit 110. A third direction DR3 may be a direction perpendicular to the first direction DR1 and/or the second direction DR2.

In another aspect, a side where a head 10 of the display device displays an image may be referred to as a front side or a front face. When the head 10 of the display device displays the image, a side where the image is not able to be observed may be referred to as a rear side or a rear face. When looking at the head 10 of the display device from the front side or the front face, a side of the first long side LS1 may be referred to as a top side or a top face. Similarly, a side of the second long side LS2 may be referred to as a bottom side or a bottom face. Similarly, a side of the first short side SS1 may be referred to as a right side or a right face, and a side of the second short side SS2 may be referred to as a left side or a left face.

In addition, the first long side LS1, the second long side LS2, the first short side SS1, and the second short side SS2 may be referred to as edges of the head 10 of the display device. In addition, points where the first long side LS1, the second long side LS2, the first short side SS1, and the second short side SS2 meet each other may be referred to as corners. For example, a point where the first long side LS1 and the first short side SS1 meet each other may be a first corner C1, a point where the first long side LS1 and the second short side SS2 meet each other may be a second corner C2, a point where the second short side SS2 and the second long side LS 2 meet each other may be a third corner C3, and a point where the second long side LS2 and the first short side SS1 meet each other may be a fourth corner C4.

In this connection, a direction from the first short side SS1 to the second short side SS2 or a direction from the second short side SS2 to the first short side SS1 may be referred to as a left and right direction LR. A direction from the first long side LS1 to the second long side LS2 or a direction from the second long side LS2 to the first long side LS1 may be referred to as an up and down direction UD.

FIG. 2 is a view illustrating an embodiment of the display device 10 associated with the present disclosure. As shown in FIG. 2, the display device 10 of the present disclosure includes a display unit 110 on which a screen is output, a moving portion 100 including a stand 150 for supporting the display unit 110 and a support 170 for mounting the display unit 110 on a floor, and a stationary station 180.

In the present disclosure, the display unit 110 is able to be moved to a place where the display unit 110 is desired to be used by moving the moving portion 100, so that the single display unit 110 is able to be used in various places without a need for including an unnecessarily large number of display units 110. When a user wants to watch an image in a living room, the user may move the display unit 110 to the living room. Further, when the user wants to use the display unit 110 in a kitchen, the user may move the display unit 110 to the kitchen. Further, when the user wants to watch the image in a bedroom, the user may move the display unit 110 to the bedroom.

The moving portion 100 is equipped with its own battery 175 (see FIG. 8) without a separate power line, so that the user may watch the image for a certain period of time without a power connection. Instead, when the display unit 110 is not in use, the display unit 110 may be coupled to the station 180 to charge the battery 175 located in the moving portion 100.

Depending on situations where the user is sitting on a sofa and watching the image, where the user is standing and watching the image while washing dishes, and where the user is lying on a bed and watching the image, a height of the display unit 110 varies, so that the user may watch the image in a comfortable state. Therefore, the display unit 110 of the present disclosure may move in the up and down direction on the stand 150.

FIG. 3 is an exploded perspective view of the display device 10 associated with the present disclosure. The display unit 110 may include a display panel 101 on which the image is output, a support structure 105 for protecting the display panel 101 by covering a rear face or a periphery of the display panel 101, and a driver 102 for driving the display panel 101. The display panel 101 may be disposed on a front face of the display device 10 to output the image. Further, the display panel 101 may output the image using a plurality of pixels. In this connection, the display panel 101 may control the plurality of pixels such that each of the plurality of pixels emits light to exhibit corresponding color, brightness, and saturation. The display panel 101 may be divided into an active region in which the image is output and an inactive region in which the image is not output. Further, the inactive region may be located around the active region and may be covered using a case or the like.

The display panel 101 may include at least one of a liquid crystal display (LCD), a thin film transistor-liquid crystal display (TFT LCD), an organic light-emitting diode (OLED), a flexible display, a three-dimensional display (3D display), and an electronic ink.

The organic light-emitting diode panel may be implemented thinly without a need for a backlight unit, and may be implemented such that a bezel is almost 0, so that the organic light-emitting diode panel may include only a rear face support structure without a structure surrounding a perimeter of a front face.

The support structure of the display panel 101 may have a heat dissipation structure such that, in addition to heat generated from the display panel 101, heat generated from the driver 102 for driving the display panel 101 located on a rear face of the support structure may be easily dissipated.

As a thickness of the display unit 110 becomes smaller, the support structure contains a metal material or forms a bead and adds a reinforcing bracket 102 to enhance a rigidity of the display unit 110. The bead means an unevenness formed using a press method on the support structure 105 of the metal material without addition of a reinforcing member. An installation frame 103 may be further disposed at a position where the driver 102 is mounted such that the heat from the driver 102 is not directly transmitted to the display panel 101.

The stand 150 and the support 170 are structures for standing the display unit 110 on the floor. The stand 150 has a wide bottom face to be stably fixed on the floor, and the stand 150 extends in the up and down direction to be positioned at a vertical level suitable for watching the image output from the display panel 101. A lower portion of the stand 150 is coupled with the support 170 and an upper portion thereof is coupled with the display unit 110.

The display unit 110 according to the present disclosure may further include a slide bracket 140 such that the display unit 110 is coupled to the support 170 in a manner of being slidable in the up and down direction without being fixed to the support 170. The slide bracket 140 may be fixed to the display unit 110 using a screw 146, and the like, and may be moved in the up and down direction along the stand 150.

A back cover 160 that covers a region of a rear face of the display unit 110 on which various parts are mounted and a coupling portion of the stand 150 and the slide bracket 140 to prevent the region and the coupling portion from being exposed to the outside may be further included. Particularly, because the display device 10 of the present disclosure is mobile, a rear face of the display device 10 may also be seen by the user. Therefore, unlike the conventional stationary display unit 110, it is necessary to minimize exposure of disordered terminals or parts on the rear face thereof, so that the display unit 110 may be connected to the support 170 through the stand 150.

A lower stand 151, which may be seen from the front by being located below the display unit 110, may form an exterior structure using the same material as that of the back cover 160. Further, an upper portion of the stand 150 may have a hollow defined in a center thereof such that the slide bracket 140 may be positioned in the center thereof, and may be formed in a shape of slide bars 152 respectively arranged at both sides of the slide bracket 140. The slide bracket 140 may move along the slide bars 152 in the up and down direction, and a pair of slide bars 152 may respectively support the slide bracket 140 at both left and right sides.

The display unit 110 of the display device 10 according to the present disclosure accounts for a majority of a total weight of a product. A full-automatic driver such as a motor may be used to move the display unit 110 in the up and down direction, but the full-automatic driver has a problem that a volume, a weight, and a manufacturing cost of parts increase. Because an operation of moving the display unit 110 in the up and down direction by the user is not continuously repeated, it is inefficient to put parts having a large volume for the corresponding function, so that a structure capable of manually moving the display unit 110 may be formed.

In order to manually move the display unit 110 in the up and down direction, the user has to push the display unit 110 upward with a force corresponding to a weight of the display unit 110. Further, conversely, when pushing the display unit 110 downward, the display unit 110 should be prevented from falling downward due to the weight of the display unit 110. The present disclosure may include a roll spring 155 as an elastic portion for supporting the weight of the display unit 110.

The roll spring 155 is located at a top of the stand 150. The roll spring 155 is a kind of a leaf spring that is rolled in a roll shape by curving a tape-shaped metal plate at a constant curvature, and has elasticity of being rolled back in the roll shape. Thus, when one side of the roll spring 155 is pulled, the number of windings decreases and the roll spring 155 is unwound. Further, when a pulling force is removed, the roll spring 155 is returned to an original shape thereof by the elasticity. Each end of the roll spring 155 is coupled to the slide bracket 140 to provide a force of pulling the display unit 110 upward.

FIG. 4 is a view of a coupled state of the slide bracket 140, the stand 150, and the display unit 110 of the display device 10 associated with the present disclosure viewed from one side, and FIG. 5 is a view of a coupling state of the slide bracket 140 of FIG. 4 and a height adjusting portion viewed from the other side.

The slide bracket 140 includes a portion fixed to the display unit 110 and a portion coupled to the roll spring 155 of the stand 150. Therefore, the slide bracket 140 may include only one horizontal beam 142a coupled to the roll spring 155 and coupled to the rear face of the display unit 110. However, in order to minimize shaking when the display unit 110 moves in the up and down direction, a pair of horizontal beams 142a and 142b arranged in the up and down direction may be used to minimize the shaking of the display unit 110.

That is, as shown in FIG. 4, each vertical beam 143 for connecting the pair of horizontal beams 142 with each other may be included, and each guide roller 145 may be disposed to smoothly move in the up and down direction at each position where each horizontal beam 142 and each slide bar 152 intersect with each other. That is, when two guide rollers 145 are arranged left and right sides of a single horizontal beam 142 and coupled to the single horizontal beam 142, four guide rollers 145 coupled to the pair of horizontal beams 142 may be arranged. The guide roller 145 may move along each guide rail 156 formed on each slide bar 152, and a pair of guide rollers 145 arranged in the up and down direction may move along the same guide rail 156.

The guide rails 156 may be respectively formed on the slide bars 152 to be directed outwardly in the left and right directions. A horizontal spacing between the guide rollers 145 is larger than a spacing between the slide bars 152. That is, a width in a horizontal direction of the slide bracket 140 may be larger than the spacing between the slide bars 152.

The guide rail 156 may not be necessarily directed outwardly as shown in FIG. 4, but may be directed inwardly. In this case, the guide roller 145 of the slide bracket 140 may be positioned between the pair of slide bars 152.

However, as shown in FIGS. 4 and 5, the slide bracket 140 having the width greater than the spacing between the slide bars 152 may be used to position the slide bar 152 between the slide bracket 140 and the display unit 110, so that a defect in which the slide bracket 140 deviates from the slide bar 152 may be prevented.

In this connection, the slide bracket 140 may include a slide groove 144 defined therein having a shape corresponding to the slide bar 152 such that the slide bar 152 and the slide bracket 140 may move without being distorted.

As shown in FIG. 5, an end of the roll spring 155 may be coupled to the base plate 141 coupled to the pair of horizontal beams 142. With only the vertical beams 143 on both sides, an angle of a corner of the slide bracket 140 may not be maintained at a right angle and the horizontal beam 142 may be deformed obliquely, so that the base plate 141 may be fastened such that the pair of horizontal beams 142 are not distorted.

FIG. 6 is a view for describing a principle of a roll spring of the present disclosure. (a) in FIG. 6 is a graph for describing a correlation between a load and a stroke (extended length) of the roll spring 155 of the present disclosure and of a line spring. A length of the line spring of a conventional spring form increases in proportion to a pulling force until a limit is reached. However, the roll spring 155 of the present disclosure is a constant spring, and a returning force (the load) thereof generated when the roll spring 155 is stretched in a straight line is constant regardless of the stroke. That is, after reaching a maximum load, an elastic force is constant no matter how much the roll spring 155 is stretched. Further, the roll spring 155 is pulled with a constant elastic force until a tape is released, that is, until a maximum stroke is reached.

Using such characteristics, the roll spring 155 having a slightly higher level of elasticity than a sum of weights of the display unit 110 and the slide bracket 140 of the present disclosure (referred to as a self-weight of the display unit for convenience of description) may be used. Because a friction occurs between the slide bracket 140 and the slide bar 152 and a friction force occurs with the roll spring 155 in a spring seat 153 when the display unit 110 moves in the up and down direction, in consideration of this, the roll spring 155 may be designed such that the elasticity of the roll spring 155 is greater than the self-weight of the display unit by the friction force as shown in (b) in FIG. 6. (self-weight of display unit+friction force=elastic force of spring)

When the user applies a force downwardly to descend the display unit 110, the roll spring 155 moves by a distance pushed by the user. Further, when the user lets go of the display unit 110, a force of pulling upwards by the roll spring 155, the friction force, and the self-weight of the display unit 110 are balanced and the roll spring 155 stops at that position. Because the elasticity of the roll spring 155 is constant regardless of the extended length of the roll spring 155, the display unit 110 may be fixed at any position. When the user applies a force upwardly to ascend the display unit 110, a force is added to the balanced force in the upward direction, so that the display unit 110 may move upward by the returning force of the roll spring.

As shown in FIGS. 4 and 5, a plurality of roll springs may be used as the roll spring 155, and the roll springs 155 may be designed such that the number of roll springs is adjusted based on the weight of the display unit 110 to balance the weight of the display unit 110 and a weight of the roll spring 155. The elasticity of the roll spring 155 depends on a width of the tape or the number of windings. The greater the number of windings, the greater the elasticity. Further, when the numbers of windings are the same, the greater the width, the greater the elasticity. When the number of windings is great, a small number of roll springs may be used, but a thickness of the roll spring increases instead. Therefore, the roll spring 155 having an appropriate thickness and an appropriate elasticity may be designed using several roll springs with small number of windings.

The roll spring 155 is located in the spring seat 153 located at the top of the stand 150, and the roll spring 155 is not fixed with an adhesive or a fastener. A seating groove corresponding to a shape of the roll spring 155 is defined in the spring seat 153, so that the roll spring 155 may be unwound or wound while rotating in the seating groove without departing from the seating groove. The spring seat 153 in a form surrounding a portion of an outer circumferential face of the roll spring 155 may have partition walls 153a spaced apart from each other at an interval corresponding to a width of the roll spring 155. The partition walls 153a serve to prevent the roll spring 155 from moving in the left and right direction while rotating.

FIG. 7 is a view illustrating a state in which the roll spring 155 of the display device 10 associated with the present disclosure is stretched, and FIG. 8 is a view for describing a position of the display unit 110 based on a state of the roll spring 155 of the display device 10 associated with the present disclosure.

As shown in (a) in FIG. 8, when the user pushes the display unit 110 downward while the display unit 110 is positioned at a top, the display unit 110 descends as shown in (b) in FIG. 8 while the roll spring 155 is unwound. In this connection, the display unit 110 may automatically move downward by the self-weight of the display unit 110 when the user applies a force only at the beginning. The elasticity of the roll spring 155 increases as the roll spring 155 is unwound, so that a speed is gradually decreased and the display unit 110 stops when reaching a stopper 154.

As shown in FIG. 7, the stand 150 may further include the stopper positioned to be spaced apart from the spring seat 153 in the downward direction. The stopper 154 may limit a range of movement of the slide bracket 140 such that the slide bracket 140 no longer descends in the downward direction. The guide roller 145 of the slide bracket 140 moves downward along the guide rail 156 and is located at a bottom, and the roll spring 155 is unwound by the moving distance of the display unit 110.

In a state of being descended as shown in (b) in FIG. 8, when the user pushes the display unit 110 upward again, the display unit 110 returns to a state in (a) in FIG. 8 by the elasticity of the roll spring 155. When moving the display device 10, when the display unit 110 is located at an upper side, because a center of gravity is located at the upper side, there is a risk that the display device 10 may fall while moving. Because it is stable to move the display unit 110 while the center of gravity thereof is located at a lower side as much as possible, so that it is preferable to move the display device 10 after descending the display unit 110 to a first position, which is a lowermost position, as shown in (b) in FIG. 8. That is, there is a need to guide the display unit 110 to be located at the bottom when moving the display unit 110, and to fix the display unit 110 when user is viewing the image.

The present disclosure may include an automatic stopper structure in which the display unit 110 may be automatically fixed on the floor when the user ascends the display unit 110 for the viewing even when the user does not separately fix the display device 10, and the display unit 110 may be freely moved using a moving wheel 174 located on a bottom face of the support 170 as the fixation is released when the user descends the display unit 110 for the movement.

As shown in (a) and (b) in FIG. 8, a push bar 123 extending vertically from the bottom of the display unit 110 is included. When the display unit 110 moves upward, the push bar 123 also moves upward. Further, when the display unit 110 moves downward to the lowermost position, that is, the first position, as shown in (b) FIG. 8, the push bar 123 also moves downward.

FIGS. 9 and 10 are views illustrating movements of the push bar 123 and a link structure 125 based on positions of the display unit 110 of the display device 10 associated with the present disclosure. Further, FIG. 11 is a view illustrating link guides 1252a, 1252b, 1254a, and 1254b that guide a movement of the link structure 125 of the display device 10 associated with the present disclosure.

A housing of the support 170 and an exterior cover of the lower stand are omitted to illustrate the push bar 123 and the link structure 125. The support 170 may include a fastening bracket 173 to which the slide bar is fixed for supporting the display unit 110 from falling, and the link structure 125 may be coupled to the fastening bracket 173. The present disclosure includes a moving stopper 128 that selectively protrudes downwardly of the support 170.

The moving stopper 128 may protrude downwardly of the support 170 to fix the support 170 to the floor face when the display unit 110 moves upward as shown in (a) in FIG. 8. The moving stopper 128 includes a member 128a having a high friction force, such as rubber or silicon, to fix the display device 10 such that the display device 10 does not move by the moving wheel 174 located at a lower portion of the support 170, thereby preventing the display unit 110 from falling in a state of being moved upwardly.

As shown in FIG. 9, when the display unit 110 moves upward, the push bar 123 also moves upward, and the moving stopper 128 moves downward to be in close contact with the floor face. As shown in FIG. 10, when the display unit 110 moves to the first position, which is the lowermost position, the push bar 123 also moves downward, and the moving stopper 128 is lifted upward and is accommodated inside the support 170, so that the display device 10 may be moved using the moving wheel 174.

The link structure 125 is connected to a bottom of the push bar 123. In the link structure 125, a plurality of links are connected with each other through a hinge coupling, so that the links move continuously based on the movement of the push bar 123, and finally the moving stopper 128 moves in the up and down direction.

In a detailed description of the link structure 125 of the present embodiment, one end of a first link 1251 connected to the bottom of the push bar 123 moves in the up and down direction based on the movement of the push bar 123, and the other end of the first link 1251 is connected to one end of a second link 1252. The second link 1252 extends in the first direction (a front and rear direction of the display unit 110) and moves in the first direction based on to a movement of the first link 1251.

First link guides 1252a and 1252b for guiding a moving direction of the second link 1252 may be arranged on a side face of the second link 1252 such that the second link 1252 moves only in the first direction and does not move in the up and down direction or another direction, as shown in FIG. 11. Next, a third link 1253 connected to the other end of the second link 1252 is positioned obliquely in a direction between the first direction and the second direction when the display unit 110 is moved upward as shown in FIG. 9. However, as shown in FIG. 10, the third link 1253 is directed in the second direction when the display unit 110 is moved downward, as shown in FIG. 10. In other words, the third link 1253 serves to push a fourth link 1254 hinged to the other end of the third link 1253 in the second direction.

The fourth link 1254 may extend in the second direction, which is the left and right direction of the display device 10, and may further include second link guides 1254a and 1254b such that the fourth link 1254 moves only in the second direction. Referring to (b) in FIG. 11, a plurality of guide protrusions inserted in a guide groove extended in the second direction are arranged on the fourth link 1254, so that the guides of the second link 1252 guide the fourth link 1254.

FIGS. 12 and 13 are views for describing positions of the moving stopper based on a position of the display unit 110 of the display device 10 associated with the present disclosure. The fourth link 1254 moves in a direction of the moving stopper 128 or in an opposite direction depending on disposition of the third link 1253. When the third link 1253 is positioned obliquely as shown in FIG. 9, the fourth link 1254 moves in a direction to be farther away from the moving stopper 128. Further, when the third link 1253 is directed in the second direction as shown in FIG. 10, the fourth link 1254 moves in the direction of the moving stopper 128.

(a) in FIG. 12 is a view illustrating the fourth link 1254 and the moving stopper in a state in FIG. 9, and (b) in FIG. 12 is a diagram illustrating the fourth link 1254 and the moving stopper in a state in FIG. 10. A first cam 126 including an inclined face is located at an end of the fourth link 1254, and a second cam 127 moving along the inclined face of the first cam 126 and being coupled to the moving stopper 128 is included. The inclined face of the first cam 126 is an inclined face whose height decreases outwardly.

As shown in FIG. 9, as the display unit 110 moves upward and the push bar 123 moves upward, the link structure 125 moves and the fourth link 1254 moves in the direction to be farther away from the moving stopper. In this connection, the second cam 127 is located on a lowermost portion of the inclined face of the first cam 126, so that the moving stopper 128 is exposed downwardly of the support 170 (see (a) in FIG. 12). As shown in (a) in FIG. 13, a compression spring 129 is included between the support 170 and a fastening bracket 173 and presses the moving stopper 128 downwardly to provide a force for fixing the moving stopper 128 on the floor face.

Conversely, as shown in FIG. 10, as the display unit 110 moves downward and the push bar 123 moves downward, the link structure 125 moves and the fourth link moves toward the moving stopper 128. In this connection, the second cam 127 moves upward while moving along the inclined face of the first cam 126, and the moving stopper 128 also moves upward. As shown in (b) in FIG. 13, the compression spring 129 is compressed and shortened as a support bracket 129 moves upward.

The embodiment shown in FIG. 9 is provided with two moving stoppers 128 and two link structures 125. At least two moving stopper 128 may be included to stably fix the display device 10, and the number of link structures 125 may vary based on the number of moving stoppers 128.

Referring to FIGS. 9 and 10 again, a pipe-shaped moving rail 124 extending from the bottom of the display unit 110 and into which an upper portion of the push bar 123 inserted may be further included. The moving rail 124 guides the push bar 123 not to be bent in the left and right direction when the push bar 123 moves in the up and down direction. The push bar 123 may be smoothly moved in the up and down direction using an unevenness extending in the up and down direction between the moving rail 124 and the push bar 123.

There is a difference between the moving distance of the display unit 110 in the up and down direction and a moving distance of the push bar 123 in the up and down direction. Because the display unit 110 may be viewed at various vertical levels depending on the situation, a height adjustment width of the display unit 110 is large. However, in order to keep the moving stopper 128 in a protruded state at all times even when the display unit 110 moves slightly upward from the first position, when the display unit 110 moves upward to a second position, the push bar 123 moves upward and fixes the moving stopper 128 on the floor face as shown in FIG. 9. Even when the display unit 110 moves upwardly of the second position, a position of the push bar 123 should be fixed without changing anymore. Therefore, in order to cushion a change in a distance between the push bar 123 and the display unit 110, a tension spring may be interposed between the display unit 110 and the push bar 123.

The tension spring 122 maintains a tensioned state when the display unit 110 is positioned at the second position or higher, and gradually decreases in length when the display unit 110 moves downward. When the display unit 110 reaches the second position, a shortest distance of the tension spring 122 is achieved and the push bar 123 moves downward. As shown in FIG. 10, when the display unit 110 reaches the first position, the push bar 123 moves the link structure 125, so that the moving stopper 128 is separated from the floor face.

That is, the tension spring 122 between the display unit 110 and the push bar 123 is a component required to maintain the state of the moving stopper 128 of being protruded from the bottom of the support 170 regardless of which vertical level the display unit 110 is located except when the display unit 110 is located at the first position.

FIG. 14 is a view illustrating another embodiment of a link structure of the display device 10 associated with the present disclosure. In addition to the link structure described in FIGS. 9 to 13, a lever structure may be used as shown in FIG. 14.

The link structure 125 of the present embodiment may have a lever shape in which one end thereof is connected to the bottom of the push bar 123, the other end thereof is connected to a top of the moving stopper 128, and a support point fixed to the fastening bracket 173 is included at a central portion of the link structure 125. The link structure 125 pivots around the support point. When the push bar 123 moves downward as shown in (a) in FIG. 14, as one end of the link structure 125 moves downward and the other end thereof moves upward, the moving stopper 128 moves upward and is accommodated inside the support 170. Conversely, when the push bar 123 moves upward as shown in (b) in FIG. 14, as one end of the link structure 125 moves upward and the other end thereof moves downward, the moving stopper 128 is exposed outside the support 170 and is fixed on the floor face.

Except for the link structure 125, the compression spring 129 that presses the moving stopper 128 to the floor face, the moving rail 124, and the tension spring 122 may be arranged in the same manner as the above-described embodiment.

FIG. 15 is a view illustrating the support 170 of the display device 10 associated with the present disclosure. The support 170 includes the battery 175 located inside housings 171 and 172, and the fastening bracket 173 is disposed to connect the support 170 with the stand 150. Because a center of gravity is biased when the battery 175 is biased to one side, the battery 175 may be disposed in a center of the support 170 and the stand 150 may be formed to be wide in the left and right direction to be fastened at both sides of the battery 175. The fastening bracket 173 may be disposed in a form surrounding the battery 175 to protect the battery 175 while stably supporting the stand 150.

The support 170 may have a flat shape such that the display unit 110 is able to stably stand without falling, and the moving wheel 174 may be disposed on the bottom of the support 170 to increase mobility. The support 170 may include a first terminal 177 exposed to the outside to charge the battery 175, and the first terminal 177 may be preferably directed in a rearward direction.

FIG. 16 is a view illustrating the station 180 of the display device 10 associated with the present disclosure. Further, FIG. 17 is a view illustrating coupling of the station 180 and the support 170 of the display device 10 associated with the present disclosure.

The station 180 includes a wire 181 to be connected to a power supply. As shown in FIG. 17, the first terminal 177 and a second terminal 183 of the station 180 are brought into contact with each other as the support 170 of the moving portion 100 is fastened to the station 180, so that the battery 175 mounted in the support 170 may be charged.

As shown in (a) in FIG. 16, an accommodating portion 182 into which the support 170 is inserted may be defined in a lower portion of the station 180 such that the support 170 of the moving portion 100 may be easily inserted therein. Because the moving portion 100 is heavy, it is difficult to achieve coupling between the moving portion 100 and the station 180 when there is a stepped portion. Thus, a bottom of the station 180 is opened.

Because the bottom of the station 180 is opened, the station 180 may have left and right sidewalls of the accommodating portion 182 such that the support 170 may be coupled to the accommodating portion 182 in position. As shown in (a) in FIG. 17, the sidewalls of the accommodating portion 182 may have oblique inclined faces and the support 170 may have inclined faces corresponding to the inclined faces of the accommodating portion 182 such that the first terminal and the second terminal 183 are in contact with each other at a correct position when the support 170 is inserted into the accommodating portion 182. That is, the support 170 may be formed in a trapezoidal shape. A fixing structure for maintaining the connection between the first terminal 177 and the second terminal 183 in a state in which the support 170 is coupled to the station 180 is required.

As shown in (b) in FIG. 17, a fixing ball 176 protruding from the support 170, and a fixing groove 184 defined inside the accommodating portion 182 and having a shape corresponding to the fixing ball 176 may be included.

The fixing ball 176 may be fixed to an end of an elastic portion 176*a* such that the fixing ball 176 is inserted into the fixing groove 184 when the user pushes the moving portion 100 into the accommodating portion 182 of the station 180 and is separated from the fixing groove 184 when the user pulls the moving portion 100 and separates the moving portion 100 from the accommodating portion 182. That is, as the elastic portion is retracted and extended, the fixing ball 176 may be coupled to and separated from the fixing groove 184.

The fixing groove 184 may be defined in a form protruding from an inner corner of the accommodating portion 182. A corner of the support 170 may be formed to define a recess 171*a* therein, and the fixing ball 176 may be located in the recess 171*a*.

As shown in (b) in FIG. 16, the station 180 may include a wall-attaching fixture 187 for fixing disposed on a rear face thereof. A fixing position is not limited to a wall, and the station 180 may be fixed to the floor when the fixture is disposed on a bottom of the station 180. The station 180 should be fixed, so that the station 180 is able to be coupled with the moving portion 100 without shaking when the station 180 is coupled to the moving portion 100 having some weight.

In addition, a vent hole 186 may be further included because heat may be generated when charging the battery of the support 170, and a status display 185 may be included to determine whether the charging is performed.

As discussed above, the display device 10 according to the present disclosure is equipped with the battery 175, so that the image may be watched while the power is not connected to the display device 10, and the display device 10 may be used regardless of a location. Therefore, the display device 10 has an advantage of a high degree of usability.

In addition, the height of the display unit 110 may be easily adjusted, so that the display unit 110 may be adjusted to have an appropriate height depending on the situation, such as sitting on the sofa and watching the image, lying on the bed in the bedroom and watching the image, cooking in the kitchen and watching the image, and the like, thereby increasing the degree of usability.

Further, when the display unit 110 is moved upward for the watching of the display device 10, the moving stopper 128 automatically protrudes to stably fix the display device 10. Further, when the display device 10 is moved, the display unit 110 is moved downward to lower the center of gravity and the moving stopper 128 is automatically accommodated, so that the display device 10 may be easily moved using the moving wheel 174.

In addition, the support includes a movement assist wheel, so that the display device 10 may be easily moved.

The above detailed description should not be construed as being limitative in all terms, but should be considered as being illustrative. The scope of the present disclosure should be determined by reasonable analysis of the accompanying claims, and all changes in the equivalent range of the present disclosure are included in the scope of the present disclosure.

The invention claimed is:

1. A display device comprising:
a display;
a support mountable on a floor and having a battery mounted therein;
a stand extending in a vertical direction from the support;
a slide bracket coupled to a rear face of the display and slidably coupled to the stand;
a spring seat located at a top of the stand;
a roll spring mounted on the spring seat and including a metal tape wound in a shape of a roll, wherein an end of the roll spring is coupled with the slide bracket; and
a station detachably coupled to the support to charge the battery,
wherein the display moves downward as the roll spring is unwound when the display is pressed downward by a user,
wherein the display moves upward as the roll spring is wound when the display is pressed upward by the user,
wherein the roll spring further includes a constant spring having a constant elastic force when extended by a length equal to or greater than a predetermined length, and
wherein an elastic force of the roll spring is greater than a sum of a weight of the display and a weight of the slide bracket.

2. The display device of claim 1, wherein a difference between the elastic force of the roll spring and the sum of the weight of the display and the weight of the slide bracket corresponds to a sum of a friction force between the slide bracket and the stand and a friction force between the roll spring and the spring seat.

3. The display device of claim 1, wherein the stand further includes a guide rail extending in the vertical direction, and
wherein the slide bracket includes a guide roller movable along the guide rail.

4. The display device of claim 3, wherein the guide rail includes a pair of rails spaced apart from each other in a horizontal direction, and
wherein a pair of guide rollers are arranged in the vertical direction on each of the rails.

5. The display device of claim 3, wherein the stand further includes a slide bar on which the guide rail is formed, and
wherein the slide bracket has a slide groove recessed therein to correspond to a shape of the slide bar such that the slide bar is seatable in the slide groove.

6. The display device of claim 1, wherein the roll spring further includes a plurality of springs arranged in parallel with each other in a horizontal direction, and
wherein the spring seat includes partition walls positioned between the plurality of springs.

7. The display device of claim 1, further comprising:
a moving wheel located at a bottom of the support;
a moving stopper selectably protruding from the bottom of the support for fixing the support on a surface of the floor;
a push bar coupled to a bottom of the display and movable in the vertical direction based on a movement of the display; and
a link structure for accommodating the moving stopper in the support when the push bar is located at a lowermost position and causing the moving stopper to protrude from the support when the push bar moves upward.

8. The display device of claim 1, wherein the support includes a housing having a trapezoidal shape in which a length of a front side corresponding to a front face of the display is larger than a length of a rear side corresponding to the rear face of the display, and
wherein the station has a recessed accommodating portion therein, the recessed accommodating portion having a shape corresponding to the trapezoidal shape of the housing.

9. The display device of claim 8, wherein the recessed accommodating portion has an open bottom side, an open front side, a closed top side, a closed left side, a closed right side, and a closed rear side,
wherein the display device further includes:
a first terminal formed in the support; and
a second terminal formed in the recessed accommodating portion.

10. The display device of claim 1, further comprising:
a fixing ball having a first side exposed outside of the support and a second side connected to an elastic portion inside the support,
wherein the station has a fixing groove defined at a position corresponding to the fixing ball.

11. A display device comprising:
a display;
a support mountable on a floor and having a battery mounted therein;
a stand extending in a vertical direction from the support;
a slide bracket coupled to a rear face of the display and slidably coupled to the stand;
a station detachably coupled to the support to charge the battery;
a moving wheel located at a bottom of the support;
a moving stopper selectably protruding from the bottom of the support for fixing the support on a surface of the floor;
a push bar coupled to a bottom of the display and movable in the vertical direction based on a movement of the display; and
a link structure for accommodating the moving stopper in the support when the push bar is located at a lowermost position and causing the moving stopper to protrude from the support when the push bar moves upward.

12. The display device of claim 11, further comprising:
a tension spring interposed between the push bar and the display,
wherein the push bar is located at a lower side when the display is positioned at a lowermost first position, and moves upward when the display moves upward, and
wherein the push bar does not move and the tension spring is extended when the display unit moves upwardly relative to a second position.

13. The display device of claim 12, further comprising:
a pipe-shaped moving rail extending from the bottom of the display, wherein a top of the push bar is insertable into a lower portion of the moving rail,
wherein the tension spring is located inside the moving rail and the push bar moves in the vertical direction along the moving rail.

14. The display device of claim 11, wherein the link structure is extended toward the moving stopper when the push bar moves downward, and
wherein the display device further includes:
a first cam located at an end of the link structure and having an inclined face; and
a second cam coupled to the moving stopper and movable along the inclined face of the first cam to move the moving stopper upward or downward.

15. The display device of claim 14, wherein the link structure includes:
a first link having a first end hinged to a bottom of the push bar;
a second link having a first end hinged to a second end of the first link, and movable in a first direction;
a third link having a first end hinged to a second end of the second link, wherein an orientation of the third link is changed depending on a position of the push bar; and
a fourth link having a first end hinged to the third link, extending in a second direction, and having a second end coupled to the first cam.

16. The display device of claim 15, further comprising:
a first link guide for guiding the second link to move in the first direction; and
a second link guide for guiding the fourth link to move in the second direction.

17. The display device of claim 14, further comprising:
a fastening bracket located inside the support; and
a compression spring interposed between a bottom of the fastening bracket and the moving stopper.

18. The display device of claim 11, wherein the link structure includes a first end hinged to a bottom of the push bar, a second end hinged to a top of the moving stopper, and a support point disposed between the first end and the second end of the link structure and fixed to the stand,
wherein the first end of the link structure moves downward and the second end of the link structure moves upward to accommodate the moving stopper in the support when the push bar moves downward, and
wherein the first end of the link structure moves upward and the second end of the link structure moves downward and causes the moving stopper to protrude from the bottom of the support to fix the support when the push bar moves upward.

19. The display device of claim 11, wherein the moving stopper includes a pair of stoppers respectively located at a left side and a right side of the support, and
wherein the link structure includes a pair of structures respectively extended from the push bar toward a corresponding stopper of the pair of stoppers.

* * * * *